3,174,876
PROCESS FOR SEPARATING SUGARS
John B. Stark, Berkeley, Calif., assignor to the United States of America as represented by the Secretary of Agriculture
No Drawing. Filed Mar. 6, 1963, Ser. No. 263,359
2 Claims. (Cl. 127—46)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of processes for separating sugars. A particular object is the provision of processes for separating sucrose from glucose or other monosaccharides. Further objects of the invention will be obvious from the following description wherein parts and percentages are by weight unless otherwise specified.

In recent years it has been shown that ion exchange resins can be employed in separation techniques which do not actually involve any ion exchange. The new technique differs from conventional ion exchange in that it is based on what may be termed differential sorption or differential exclusion of the compounds to be separated; it does not involve exchange between the ions of the compounds and the ions of the exchange resin. In a typical application of this process an aqueous solution of glycerine and sodium chloride is applied to a cation exchange resin in the sodium form. The resin column is then washed with water and the effluent collected in successive fractions. Of the two compounds (glycerine and NaCl) in contact with the resin, the glycerine is absorbed by the resin to a greater extent than the NaCl, or, stated conversely, the sodium chloride is excluded from the resin to a greater extent than the glycerine. The net result is that the sodium chloride will appear in the early portions of the effluent whereas the glycerine will appear in later portions of the effluent and thereby a separation is attained. The technique in question has been employed not only to separate ionized compounds from nonionized or poorly ionized compounds but has even been extended to separate certain classes of non-ionized compounds. Thus, for example, British Patent 731,335, published June 8, 1955, discloses the use of preferential sorption techniques to separate glucose from acetone and to separate sucrose from triethylene glycol, glycerine or phenol, etc.

It has now been found that differential sorption with ion exchange resins can be employed to obtain a separation of sucrose from glucose, fructose, or other monosaccharides. The procedure of the invention involves the following steps: The starting material—an aqueous solution containing the sucrose plus monosaccharide components—is applied to a column of an ion exchange resin. The column is then washed with water and the effluent collected. The early portions of the effluent contain mostly the sucrose whereas later portions of the effluent contain mostly the glucose or other monosaccharides. Thus, by separate collection of the early and later portions of the effluent, an effective separation of the sucrose from the monosaccharides is achieved.

It is to be emphasized that the separation of sucrose from glucose (or other monosaccharide) in accordance with the invention constitutes a completely unexpected result. Thus according to the British Patent 731,335 sucrose and glucose cannot be separated by differential sorption. The patentees base this conclusion on the facts that (1) sucrose and glucose have essentially identical distribution constants, namely, 0.23 and 0.21, respectively, and (2) that effective separation is only attained where the distribution constants of the compounds to be separated differ by at least 0.1. What these prior investigators did not realize is the different effects of static and dynamic conditions on the system. This situation is further explained as follows: The distribution constant (or K value) is determined under static equilibrium conditions. Thus, as the British patentees explain, a sample of the wet resin is mixed with an aqueous solution of the compound whose distribution constant is to be measured. This mixture is allowed to stand until it reaches equilibrium. Then the concentration of the solute in the liquid phase of the system is determined and the resulting value is used to calculate the distribution constant of the compound. An essential element in this determination is that the system stand until it reaches equilibrium, that is, until there is no change in the various parameters of the system. Under such circumstances sucrose and glucose provide almost identical values and the British patentees concluded that the two substances could not be separated by differential sorption on an ion exchange resin. My researches, however, have indicated that this reliance on a condition existing only at static equilibrium obscures the utility of differential sorption for a practical use, namely, the separation of sucrose from glucose or other monosaccharides. Thus, in operating the process of the present invention no attempt is made to attain an equilibrium condition between the liquid inside the resin and that outside the resin. Instead, the starting solution is simply applied to the resin and without any waiting period the washing cycle is initiated and carried out. Under these conditions a true preferential sorption effect is attained. Thus, the sucrose being sorbed to a lesser extent than the glucose (or other monosaccharide) moves through the column toward the outlet faster than the monosaccharide. In other words, in applying the process of the invention, the conditions of the system are not static or in equilibrium but in what may be termed a dynamic state, that is, a state wherein changes are occurring in the system.

In applying the process of the invention, one may use either a cation exchange resin or an anion exchange resin. Typical examples of suitable cation exchange resins are sulphonated phenol-formaldehyde resins, sulphonated copolymers of monovinyl aromatic hydrocarbons such as those disclosed in British Patent 577,707, and carboxylated resins such as those disclosed in U.S. Patent 2,471,818. The cation exchange resins are employed either in the acid form or in the salt form, for example, in the sodium or potassium salt form. The salt form is preferable to avoid any possibility of hydrolyzing sucrose during the separation process. Typical examples of anion exchange resins are the resinous condensation products of phenol, alkylene polyamines and ammonia, such as those disclosed in U.S. Patent 2,546,938; resinous quaternary ammonium bases or salts such as the reaction product of a tertiary amine and an insoluble cross-linked copolymer of a monovinyl aromatic hydrocarbon and a di-vinyl aromatic hydrocarbon, which copolymer contains halomethyl groups on its aromatic nuclei and the resinous reaction products of a primary amine or a secondary amine and such copolymer as described in British Patent 654,706. The anion exchange resins may be employed in the free base form. However, it is preferred to employ them in salt form, for example, as a chloride or sulphate, to avoid any possibility of decomposing the sugars during the separation process. As in other applications of ion exchangers, the resins are used in a granular form and for batch operations are held in a cylindrical vessel equipped with conventional arrangements such as an inlet at the top for introduction of the solution to be treated and the wash water and an outlet at the bottom for discharging the effluent. Prior to use the resin is soaked in water to swell the resin granules. A feature of the present invention and one which sets it apart from systems involving ion exchange is that after the washing is finished, the resin is immediately available for treatment of another batch of sugar solution. No regeneration, as essential in ion exchange procedures, is at all necessary.

As noted hereinabove, in carrying out the process of the invention the solution containing the sugars to be separated is applied to the column of ion exchange resin and the column is then washed with water to displace the respective sugars from the resin. Generally, the effluent is collected in successive portions to segregate the sugars. The portions of effluent may be tested by conventional analytical techniques to determine the sucrose/monosaccharide ratio therein. Those portions which have a high ratio, for example at least 2 parts of sucrose per part of monosaccharide, may be directly treated to recover sucrose. Thus these portions may be evaporated and crystallized in conventional manner. The portions of the effluent which have a lesser sucrose/monosaccharide ratio may be retreated by the process to obtain sucrose enriched fractions. The portions of the effluent enriched in monosaccharides may be treated by such processes as spray- or drum-drying to obtain the product in a solid state.

Although the process of the invention is useful in any instance where it is desired to separate sucrose from monosaccharides, it is particularly useful to implement commercial systems for producing crystalline sucrose. In these systems, sugar solutions are obtained from plant materials, these solutions being purified, evaporated and crystallized. The residual liquors still contain sucrose but this sucrose cannot be isolated by crystallization because the accompanying monosaccharides act as crystallization inhibitors. By the use of the invention, however, these liquors can be treated to obtain solutions enriched with respect to sucrose. These solutions can then be evaporated and crystallized to thereby obtain an increased overall yield of crystalline sucrose.

The invention is further demonstrated by the following example:

A solution was prepared containing 200 grams of sucrose, 200 grams of glucose, and sufficient water to provide a volume of 975 ml.

The solution was fed at a rate of about 50 ml. per minute into a column containing 6500 ml. of ion exchange resin granules immersed in water (cross-sectional area of the column was 56.5 sq. cm.). The resin was a commercial product—a sulphonated copolymer of approximately 80% styrene, 8% ethylvinylbenzene, and 12% divinylbenzene. The resin was in the potassium form and in particles of 50–100 mesh.

The water displaced from the column during introduction of the solution was discarded. The column was then washed with water at a rate of about 50 ml. per minute. The effluent flowing from the base of the column was collected in 325-ml. fractions. The entire process was conducted at room temperature (about 25° C.). Each fraction was analyzed for sucrose and glucose. The results are tabulated below:

| Fraction No. | Glucose concentration, mg./ml. | Sucrose concentration, mg./ml. | Glucose content, Percent on solids basis | Sucrose content, Percent on solids basis |
| --- | --- | --- | --- | --- |
| 1 to 7 | None | None | | |
| 8 | 0.5 | 11.7 | 4.1 | 95.9 |
| 9 | 5.4 | 113.7 | 4.5 | 95.5 |
| 10 | 37.7 | 152.0 | 19.1 | 80.1 |
| 11 | 95.3 | 137.7 | 40.9 | 59.1 |
| 12 | 133.0 | 77.0 | 63.3 | 36.7 |
| 13 | 124.3 | 46.7 | 72.7 | 27.3 |
| 14 | 94.8 | 23.2 | 80.3 | 19.7 |
| 15 | 55.2 | 11.6 | 82.6 | 17.4 |
| 16 | 23.5 | 4.0 | 85.5 | 14.5 |
| 17 | 10.9 | 1 | 91.6 | 8.4 |

It is evident from the above data that the process resulted in an effective separation of the two sugars. Thus the early fractions, particularly 8, 9, and 10, contained a greatly increased concentration of sucrose whereas the later fractions, particularly 13–17, contained a greatly increased concentration of glucose.

If it is intended to recover crystalline sucrose, the following plan is carried out: Fractions 8, 9, and 10 are combined to produce a composite which contains 47.9% of total sucrose originially used. This solution is so rich in sucrose, 86.3% on solids basis, that on evaporation crystals of pure sucrose are attained. The remaining fractions can be run through the system a second time and the effluent fractions enriched in sucrose are again evaporated and crystallized.

Having thus described the invention, what is claimed is:

1. A process for separating sucrose from monosaccharides which comprises applying to an ion exchange resin in the alkali metal salt form an aqueous solution containing sucrose and a monosaccharide in a given sucrose/monosaccharide ratio, substantially immediately washing the ion exchange resin, collecting a first portion of the effluent having an increased sucrose/monosaccharide ratio, and collecting a second portion of the effluent having a decreased sucrose/monosaccharide ratio.

2. The process of claim 1 wherein the monosaccharide is glucose.

References Cited by the Examiner

UNITED STATES PATENTS 3,044,905   7/62   Le Ferre _____ 127—46.2

FOREIGN PATENTS 731,335   9/53   Great Britain.

MORRIS O. WOLK, *Primary Examiner.*